United States Patent [19]

Hanaway

[11] Patent Number: 4,470,420
[45] Date of Patent: Sep. 11, 1984

[54] DIVERTABLE TAILINGS RETURN

[75] Inventor: Roger D. Hanaway, Blue Springs, Mo.

[73] Assignee: Allis-Chalmers Corporation, Milwaukee, Wis.

[21] Appl. No.: 507,028

[22] Filed: Jun. 23, 1983

[51] Int. Cl.³ ............................................. A01F 7/00
[52] U.S. Cl. ............................... 130/27 R; 130/27 F; 130/27 T
[58] Field of Search ............ 56/14.6; 130/27 R, 27 T, 130/27 F

[56] References Cited

U.S. PATENT DOCUMENTS 2,433,162 12/1947 Scranton et al. ................. 130/27 R
3,482,577 12/1969 De Paul et al. .................. 130/27 T
3,669,125 6/1972 Rowland-Hill et al. .......... 130/27 T
4,178,944 12/1979 Hanaway .......................... 130/27 R

FOREIGN PATENT DOCUMENTS 1308596 10/1962 France ............................. 130/27 R Primary Examiner—Gene Mancene
Assistant Examiner—David I. Tarnoff
Attorney, Agent, or Firm—Charles L. Schwab

[57] ABSTRACT

The tailings of a combine harvester may be optionally returned to either the cleaning section or the threshing section through operation of a flapper valve in a bifurcated gravity flow chute receiving the tailings from a tailings elevator. Side wall openings are provided at the front and rear of a foraminous threshing cage through which tailings are optionally returned to either the threshing section or to the cleaning section.

6 Claims, 4 Drawing Figures

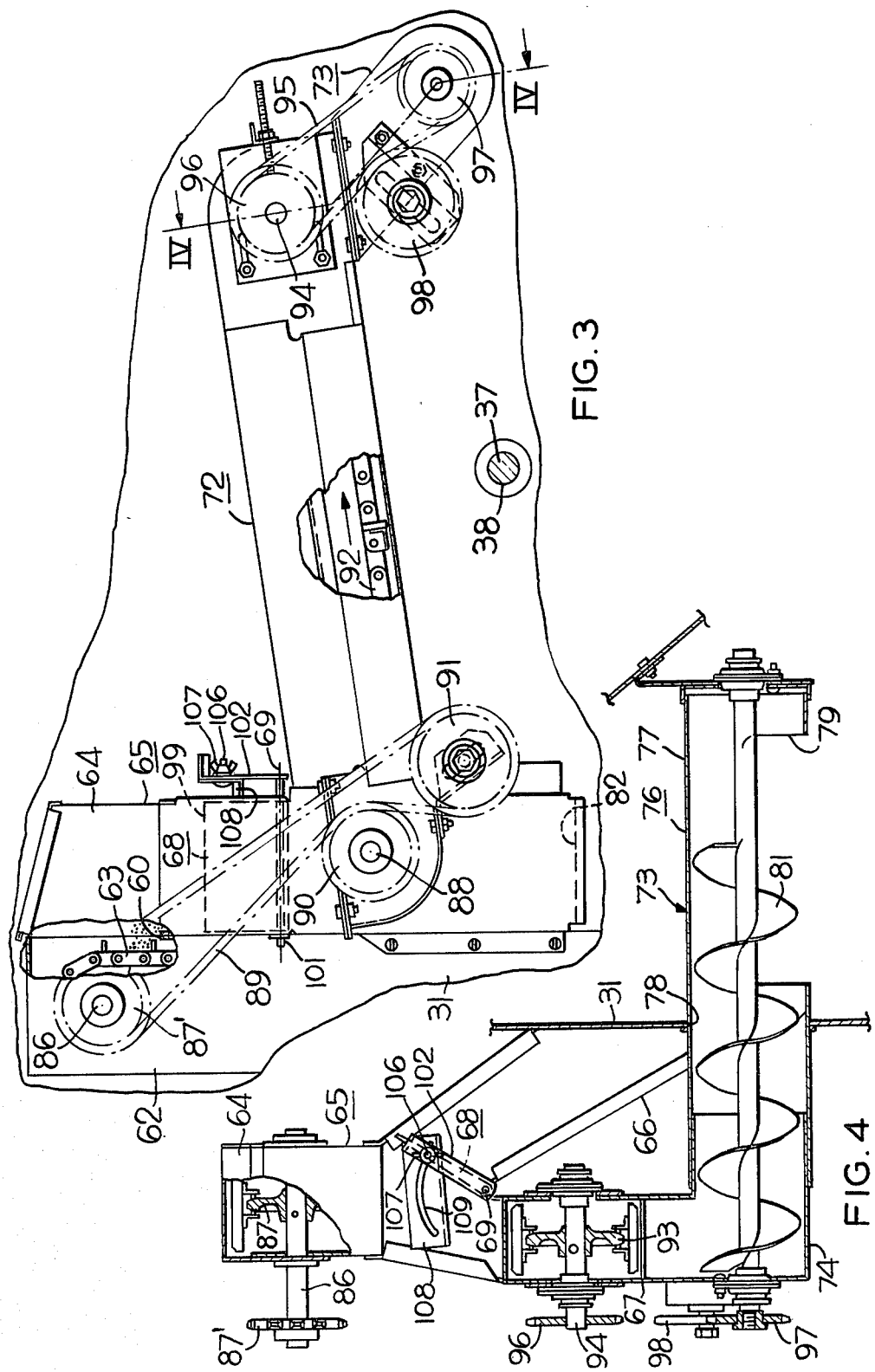

DIVERTABLE TAILINGS RETURN

RELATED APPLICATION

A similar tailings return system giving the operator the option of returning the tailings to the threshing section or to the cleaning section is shown in co-pending U.S. patent application of Wayne A. Hoefer and Garry W. Busboom, entitled "Tailings Return to Threshing Section or to Cleaning Section".

BACKGROUND OF THE INVENTION

1. Technical Field

This invention relates to agricultural harvesters and more particularly to a mechanism for optionally returning tailings to the threshing section or to the cleaning section of the harvester.

2. Information Disclosure Statement

The tailings return arrangement in French patent No. 1,308,596 issued Oct. 1, 1962 to Cima Compagnie Internationale Des Machines Agricoles McCormick permits the operator to optionally return the tailings to an impeller positioned behind the threshing cylinder or to the cleaning section. A third option available to the operator is to use a screen in the bottom of the tailings elevator to permit the clean grain in the tailings to drop to the cleaning section while the remaining tailings material is returned to the impeller behind the threshing cylinder. In U.S. Pat. No. 4,178,944 issued Dec. 18, 1979, the tailings are returned by a tailings elevator to a distribution auger and are discharged to a pair of accelerator rolls which accelerate the tailings with other threshed material to the cleaning section of the combine. In U.S. Pat. No. 3,482,577 issued Dec. 9, 1969 to R. A. DePauw et al, the tailings are returned to a threshing cylinder of an axial flow combine. The tailings elevator dumps the tailings into a transverse auger conveyor, the last portion of which is perforated to permit clean grain to fall into the cleaning section without passing through the threshing section. In U.S. Pat. No. 3,669,125 issued June 13, 1972 to E. W. Rowland-Hill and H. G. McCarty, the tailings are returned to a pair of axial flow threshing rotors by an auger conveyor. A sliding door is provided at the tailings discharge to one of the rotors to regulate the distribution of tailings to the two rotors. In U.S. Pat. No. 2,433,162 issued Dec. 23, 1947 to C. J. Scranton et al, the tailings are returned by elevator and auger to the threshing section of the combine. A partially perforated cylindrical segment, placed in surrounding relation to a section of the cylindrical auger housing having an opening in its lower half, may be rotated to a first position in which the perforations are at the opening to permit clean grain to fall to the cleaning section and may be rotated to a second position in which a solid cylindrical portion is placed in confronting relation to the opening, thereby causing all tailings to be returned to the threshing section.

SUMMARY OF THE INVENTION

This invention has particular utility in an axial flow combine for harvesting seed or grain from various crops such as wheat, oats, soybeans, corn and the like. The combine includes a threshing section having a housing made up of walls including a pair of laterally spaced vertical side walls extending in the longitudinal direction of the combine, a pair of longitudinally spaced front and rear walls and bottom wall means defining a transversely extending discharge opening permitting discharge of threshed material from the threshing section. A foraminous cylindrical cage extends between the side walls of the housing and includes a cage inlet opening for receiving crop material to be threshed together with a concave adjacent the inlet opening. A threshing rotor is disposed within the cage on the same horizontal axis as the cage; which axis is disposed transverse to the direction of travel of the combine. A cleaning section is provided in the combine for receiving threshed material discharged from the threshing section by way of the discharge opening in the bottom of the threshing section housing. The cleaning section includes means for separating light particles and tailings from the seed. A header is provided at the front of the combine to cut crops being harvested. Cut crops are fed to a longitudinally extending feeder conveyor which is operative to move crop material to the inlet opening of the cage. A tailings elevator adjacent one side wall of the threshing section housing is connected at its lower end to the cleaning section to receive tailings and has a discharge opening at its upper end. First and second wall openings are provided in the one side wall at the front and rear of the cage. The first wall opening is above the cage inlet opening. A gravity flow chute is connected at its upper end in receiving relation to the discharge opening of the tailings elevator and presents a pair of downwardly diverging discharge branches, one of which discharges through the second wall opening. Conveying means connect the other of the branches to the first wall opening in the one side wall. A flapper valve is pivotally mounted in the chute at the junction of the branches and is selectively pivotable to block either of the branches while permitting flow of tailings through the other.

In the preferred embodiment of the invention, a longitudinally extending power driven conveyor is provided having one of its opposite ends connected to the other branch of the chute. A transverse auger may be provided in the first wall opening which includes a segment extending outwardly from the one side wall to receive tailings from the longitudinally extending power driven conveyor.

BRIEF DESCRIPTION OF THE DRAWINGS

One embodiment of the invention is illustrated in the drawings in which:

FIG. 3 is an enlarged partial side view of the combine showing part of the tailings return mechanism with parts broken away for illustration purposes; and FIG. 4 is a view taken along the line IV—IV in FIG. 3 with parts broken away for illustration purposes.

DETAILED DESCRIPTION OF THE DRAWINGS

Figure 1:
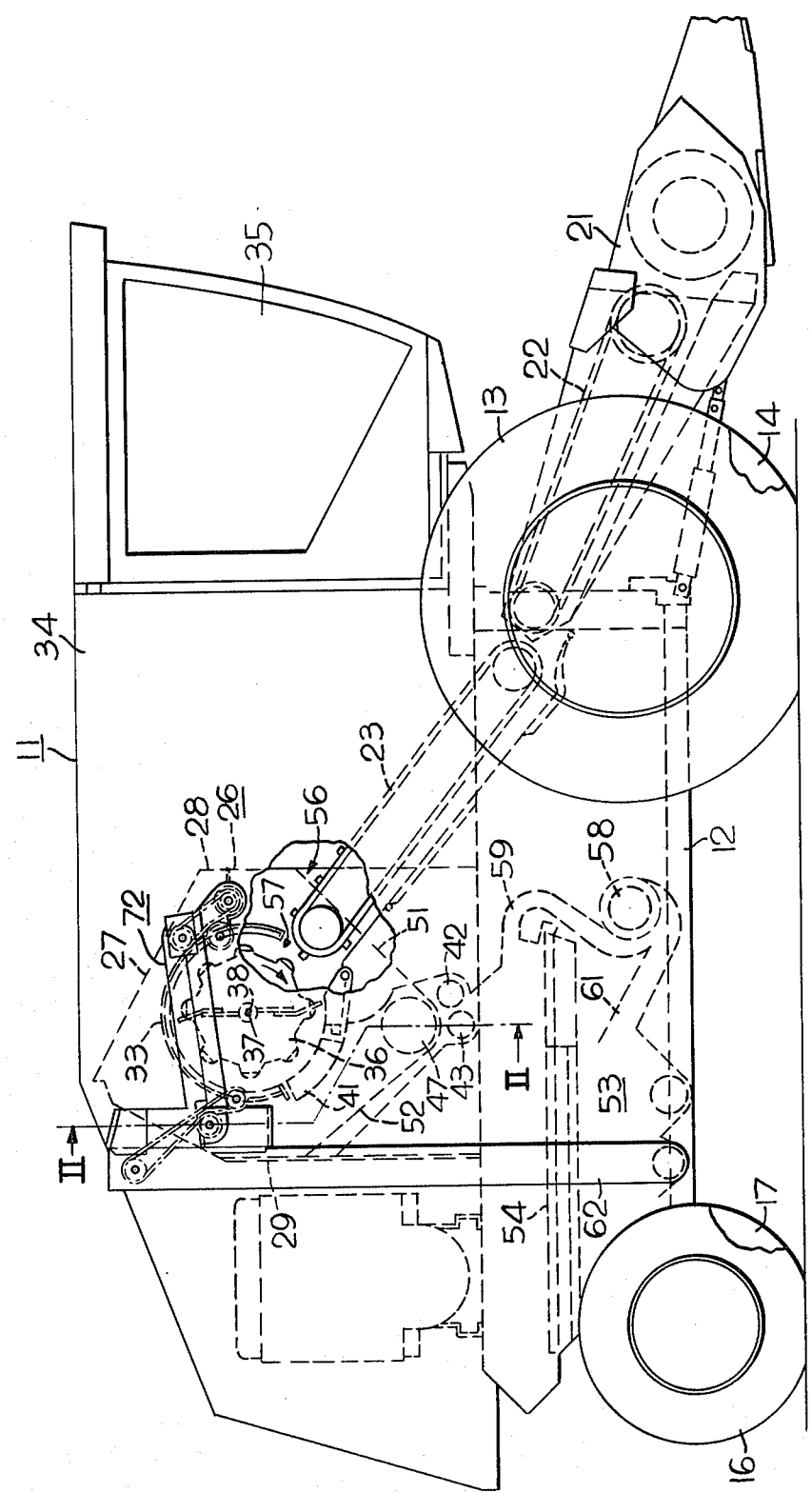
FIG. 1 is a right side view of a combine with parts broken away for illustration purposes.
Figure 2:
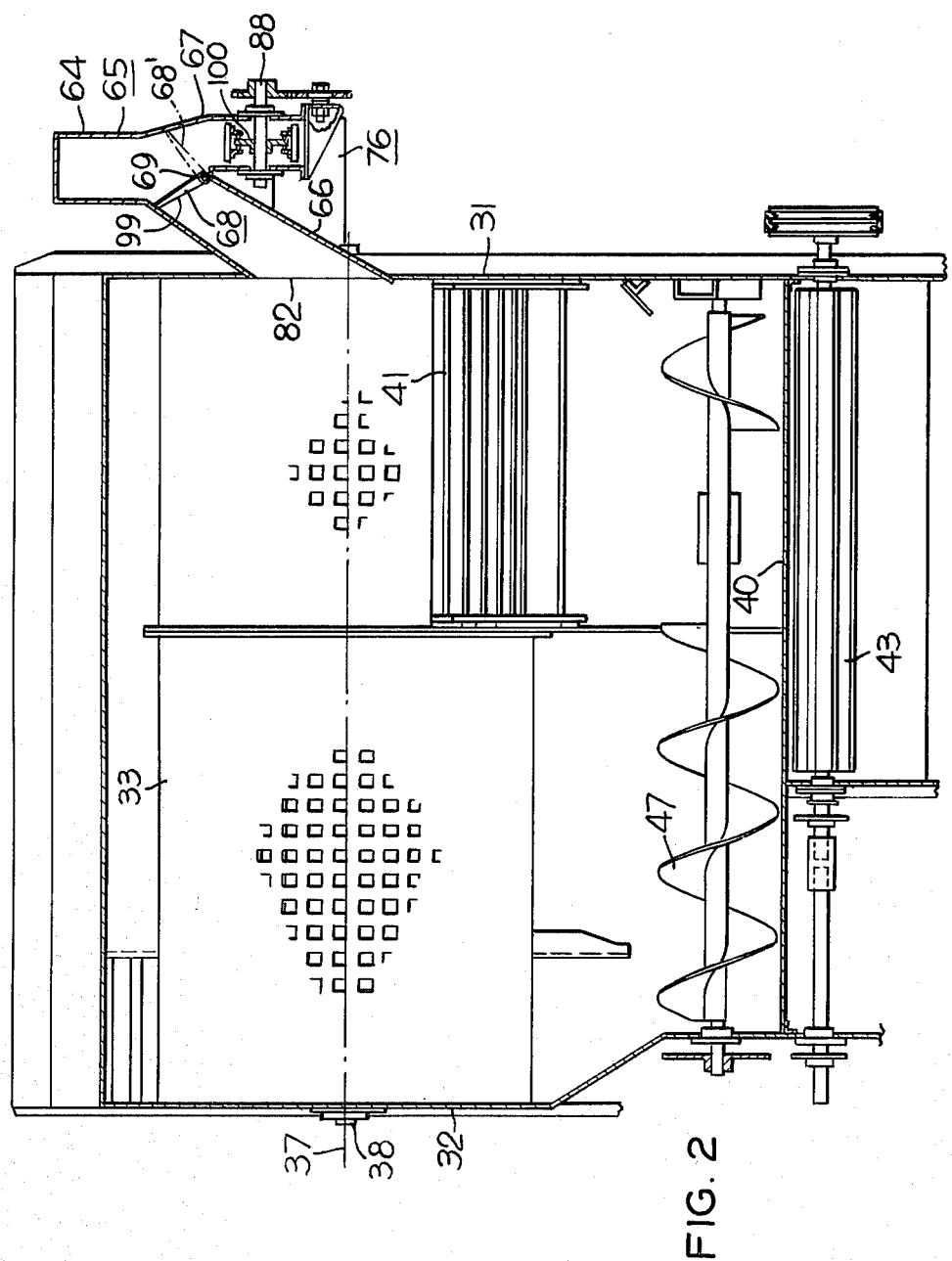
FIG. 2 is a view taken along the line II—II in FIG. 1.

Referring to FIGS. 1 and 2, the combine harvester 11 includes a main frame 12 supported by a pair of front drive wheels 13, 14 and a pair of steerable rear wheels 16, 17. A header 21 mounted on the front of the combine is operable to sever the crop which passes to conveyor apparatus in the form of lower and upper feeder conveyors 22, 23. The upper feeder conveyor 23 moves the crop material to a threshing section 26 contained within a housing 27 which includes a pair of upright front and rear walls 28, 29 and a pair of laterally spaced side walls 31, 32. A foraminous cage 33 is secured at its opposite ends to the side walls 31, 32 by suitable means, not shown. A grain bin 34 is positioned above and in front of the threshing section 26 and an operator's cab 35 is mounted on the frame 12 at the front of the combine. A threshing rotor 36 is disposed within the cage 33 on an axis 37 which is also the axis of the cage 33. A shaft 38 of the rotor 36 is rotatably supported on the axis 37 by bearing means, not shown, on the side walls 31, 32.

The crop material delivered by the upper feeder conveyor 23 passes through an inlet opening 56 in the front wall 28 of the housing 27 and then passes through an inlet opening 57 in the cage 33. The inlets 56, 57 are in general longitudinal alignment with one another. The threshing rotor 36 impacts with the incoming crop material moving it across the concave 41. The threshing housing 27 has bottom wall means forming a slot or discharge opening 40 above a pair of accelerator rolls 42, 43. Threshed crop material falling to the bottom of the portion of the housing 27 overhanging the cleaning section is distributed to the slot 40 by a distribution auger 47 disposed at the bottom of the housing 27. Threshed crop material passing through the foraminous cage 33 falls by gravity onto the lower downwardly converging portions 51, 52 of the front and rear side walls 28, 29. Threshed material passing through the slot 40 is accelerated downwardly by the accelerator rolls 42, 43 to the cleaning section 53 of the combine.

The cleaning section 53 includes a shoe assembly 54 having the usual grain pan and sieves. A blower 58 provides air by way of ducts 59, 61 for cleaning the threshed grain. Grain which is not completely separated from the hulls will not pass through the sieves and will be delivered to the bottom of a tailings elevator 62 which has a endless chain 63 with flights which move the tailings material to the upper end of the tailings elevator where it is discharged through an opening 60 into the upper end 64 of a chute 65.

Referring to FIGS. 1 through 4, the chute 65 is bifurcated into two downwardly diverging branches 66, 67 and includes a flapper valve 68 pivotally connected to the chute at the junction of the branches 66, 67 for pivotal movement about a longitudinal axis 69 between a first position in which it is shown in full lines in FIG. 2 to a second position shown in broken lines in FIG. 2. In the first position of the flapper valve, tailings are prevented from flowing through the branch 66 and are directed instead through the branch 67 which connects to the rear end of a longitudinally disposed chain and flight conveyor 72. The front end of the conveyor 72 dumps the tailings into a connecting conduit 73 through which the tailings fall by gravity to a segment 74 of a transverse auger conveyor 76 which extends laterally outward from the side wall 31. The transverse auger conveyor 76 includes a laterally inward extending segment 77 extending through a wall opening 78 in front of the cage 33 and presents a downwardly facing tailings discharge opening 79, which is disposed above the upper end of the longitudinal feeder conveyor 23 and in elevated relation to the inlet opening 57 of the cage. Thus tailings moved by the auger 81 of the transverse auger conveyor 76 to the discharge opening 79 will return to the threshing section for re-threshing. The branch 66 of the chute 65 is connected at its bottom with a wall opening 82 in wall 31 at the rear of the cage 33. When the flapper valve 68 is moved to its position shown in broken lines 68' tailings will fall by gravity through branch 66, and through the side wall opening 82 to the sloping portion 51 of the rear wall 29 thence to the accelerator rolls 42, 43 and the cleaning section. Thus, tailings returned to the wall opening 82 pass to the cleaning section without passing through the threshing section.

The upper sprocket shaft 86 of the tailings elevator carries a sprocket 87 for the chain 63 and a sprocket 87' which is connected in driving relation to the rear sprocket shaft 88 of the conveyor 72 by an endless drive chain 89 reeved above sprocket 87', about an idler sprocket 91 and partially about a sprocket 90 on the shaft 88. An endless conveyor chain 92 of conveyor 72 is reeved about a sprocket 100 on the shaft 88 and about a front sprocket 93 non-rotatably secured to a front shaft 94. A sprocket 96 is non-rotatably secured to the laterally outer end of the shaft 94 and is connected in driving relation to the auger 81 by an endless chain 95 engaging a sprocket 97 on the outer end of the auger 81, an idler sprocket 98 and the sprocket 96. Thus, both the longitudinal chain conveyor 72 and the auger conveyor 76 are driven by power from the tailings elevator 62.

Referring to FIGS. 3 and 4, a blade 99 of the flapper valve 68 is rigidly secured to a shaft 101 rotatably mounted on the chute by suitable bearings, not shown, for rotation about longitudinal horizontal axis 69. A handle 102 is secured as by welding to the front end of the shaft 101. The flapper valve 68 may be releasably secured in either of its adjusted positions by using releasable fastening means in the form of a bolt 106 and a wing nut 107 interconnecting the handle 102 and a bracket 108 welded to the chute 65. The bolt extends through a drilled hole, not shown, in the handle 102 and through an arcuate slot 109 in the bracket 108.

The tailings return system herein disclosed and described gives the operator the option of returning the tailings to the cleaning section 53 without passing them through the threshing section, by placing the flapper valve in the position shown in broken lines 68' in FIG. 2, or returning the tailings to the threshing section 26 by way of the wall opening 78 by placing the flapper valve 68 in the full line position in which it is shown in FIG. 2.

The embodiments of the invention in which an exclusive property or privilege is claimed are defined as follows:

1. In an axial flow combine for harvesting seed, the combination comprising:
   a threshing section including
      a housing having walls including a pair of laterally spaced vertical side walls extending in the longitudinal direction of the combine, a pair of longitudinally spaced front and rear walls and bottom wall means defining a transversely extending vertical discharge opening through which threshed crop material leaves the threshing section,
      a foraminous cylindrical cage extending between said side walls, including an inlet opening for receiving crop material to be threshed and a concave adjacent said inlet opening of said cage and
      a threshing rotor disposed within said cage, said cage and cylinder being disposed on a horizontal axis disposed transverse to the direction of travel of said combine,
   a cleaning section receiving threshed material from said threshing section by way of said discharge opening, said cleaning section including means for separating light particles and tailings from the seed, a header at the front of said combine for cutting and gathering crops, conveyor apparatus operative to move crop material from said header to said inlet opening of said cage, a tailings elevator adjacent one side wall of said threshing section housing connected at its lower end to said cleaning section to receive tailings and having a discharge opening at its upper end, a first wall opening in said one side wall rearwardly of said cage, a second wall opening in said side wall forwardly of said cage, a gravity flow chute connected at its upper end in receiving relation to said discharge opening of said tailings elevator and having a pair of downwardly diverging discharge branches one of which discharges through said first wall opening, conveying means connecting the other of said branches to said second wall opening and a flapper valve pivotally mounted in said chute at the junction of said pair of branches selectively pivotable between a first position in which the flow of tailings through said one branch is permitted and the flow of tailings through said other branch is prevented and a second position in which the flow of tailings through said other branch is permitted and the flow of tailings through said one branch is prevented.

2. The combine of claim 1 wherein said conveying means includes a longitudinally extending power driven conveyor having one end connected to said other branch.

3. The combine of claim 2 and further comprising a transverse auger conveyor having a discharge segment extending through said second opening and a receiving segment extending from said one side wall a predetermined distance and means connecting said other end of said driven conveyor in tailings delivery relation to said receiving segment.

4. The combine of claim 3 wherein said discharge segment of said transverse auger conveyor has a downwardly facing discharge opening whereby tailings falling therethrough are returned to said rotor by way of said cage inlet opening.

5. The combine of claim 4 wherein said power driven conveyor is a chain type conveyor having first and second parallel shafts at its opposite ends, sprockets on said shafts, an endless chain cooperatively engaging said sprockets and further comprising drive means operatively interconnecting one of said shafts in power transmitting relation to said transverse auger conveyor.

6. The combine of claim 4 wherein said tailings elevator is a chain conveyor having a sprocket shaft at its upper end and further comprising power transmitting means connecting said sprocket shaft of said tailings elevator to the other of said shafts of said chain type conveyor.

* * * * *